United States Patent
Nishikawa et al.

(10) Patent No.: US 7,064,849 B1
(45) Date of Patent: Jun. 20, 2006

(54) DATA PROCESSING APPARATUS ADAPTABLE TO PLURAL ENVIRONMENTS AND DATA PROCESSING METHOD

(75) Inventors: Satoshi Nishikawa, Yokohama (JP); Koji Nakagiri, Kawasaki (JP); Yasuo Mori, Tokyo (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,387

(22) Filed: Dec. 17, 1999

(30) Foreign Application Priority Data

Dec. 22, 1998 (JP) ............................................ 10-365515

(51) Int. Cl.
*G06F 15/00* (2006.01)

(52) U.S. Cl. ...................... 358/1.15; 358/1.1; 358/1.9; 358/1.11

(58) Field of Classification Search ................. 358/1.1, 358/1.5, 1.9, 1.11, 1.12, 1.13, 1.14, 1.15, 358/1.18, 1.16

See application file for complete search history.

(56) References Cited

U.S. PATENT DOCUMENTS

| 5,699,492 | A | * | 12/1997 | Karaki | .................... | 358/1.9 |
| 6,219,149 | B1 | * | 4/2001 | Kawata et al. | ............. | 358/1.15 |
| 6,665,081 | B1 | * | 12/2003 | Suzuki et al. | ............. | 358/1.13 |

* cited by examiner

*Primary Examiner*—Mark Wallerson
(74) *Attorney, Agent, or Firm*—Fitzpatrick, Cella, Harper & Scinto

(57) ABSTRACT

Data processing apparatus for controlling operation of a peripheral device, e.g., a printer. The data processing apparatus is adaptable to different operation environments of a peripheral device, e.g., geographic difference. Control means of the peripheral device stores a local ID indicative of environment data e.g., a country where the device is used. The local ID is acquired, and then a resource file corresponding to the local ID is acquired. The resource file stores control data of the peripheral device, which changes in correspondence with environment data. Based on the control data, setting of the peripheral device is performed. The local ID is stored so that the local ID can be used in the subsequent processing.

24 Claims, 6 Drawing Sheets

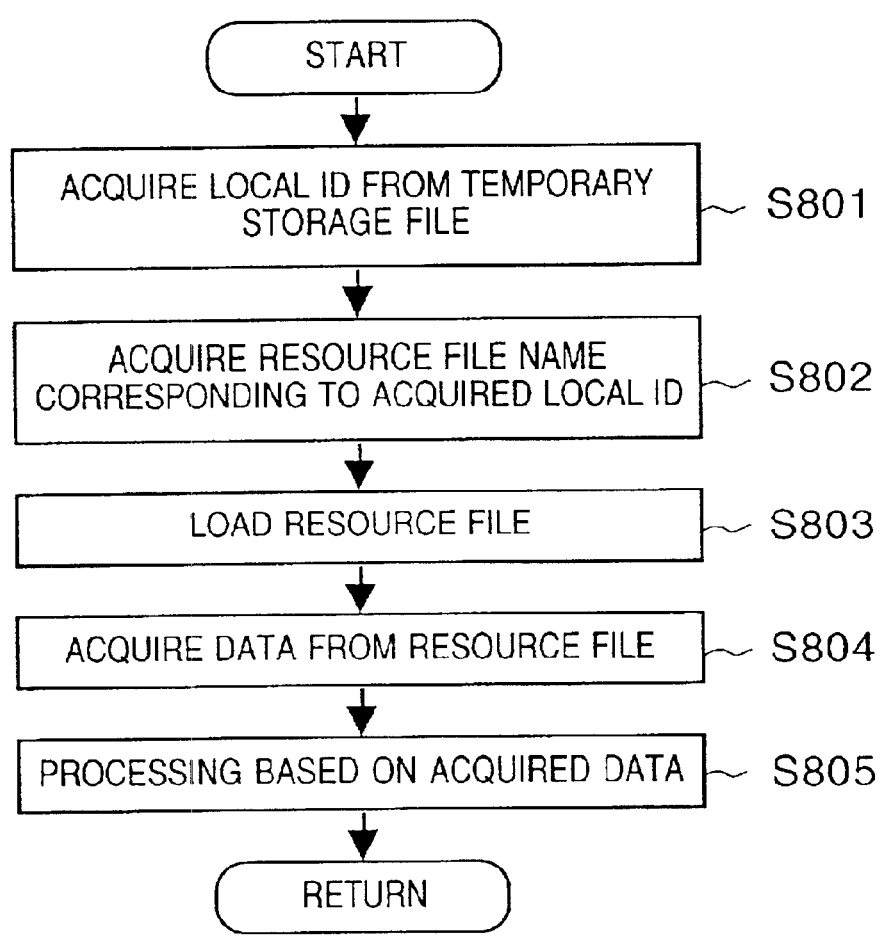

DATA PROCESSING APPARATUS ADAPTABLE TO PLURAL ENVIRONMENTS AND DATA PROCESSING METHOD

BACKGROUND OF THE INVENTION

The present invention relates to a data processing apparatus, e.g., a personal computer or the like, and more particularly, to a data processing apparatus suitably employed in a data processing system comprising peripherals e.g., a printer. Moreover, the present invention particularly relates to a data processing apparatus adaptable to plural operation environments, e.g., languages used.

Conventionally, a data processing system comprising a data processing apparatus, e.g., a personal computer or the like, connected to a display device, and external peripheral devices e.g., a printer or the like, has a mechanism for switching fonts or the like to be displayed by a display device in accordance with language information supplied by an operating system.

Such conventional system also includes a mechanism for allowing a user to switch a language displayed on a display screen by using a user interface provided by application software or a printer driver.

Furthermore, a data processing system including a data processing apparatus, e.g., a personal computer or the like, which is connected to a printer conventionally comprises: spool means for temporarily storing data in a different data format (so-called intermediate code) prior to generating print data to be transmitted to a printer; de-spool means for generating print data to be transmitted to the printer based on the data temporarily stored in the intermediate code format, and means for generating printer control commands.

Such conventional mechanism or system is provided separately for different operation environments, especially for countries in which the mechanism or system is used, even though processing actually performed in the system is mostly the same. For instance, software, e.g., operating systems, application programs, device drivers and so forth, operating in a conventional mechanism or system are prepared as separate products for each of the different countries. Taking printer driver software as an example, information which differs for each country, e.g., default font setting or a language used in messages displayed in a user interface screen or the like, is predetermined within the printer driver. Therefore, country setting information or data cannot be obtained from external software.

For the same reason, operation control means must also be prepared for each environment in the system in which output data is temporarily stored in an intermediate code format.

On the other hand, application programs and printer drivers, having a mechanism for switching fonts to be displayed in accordance with language information supplied by an operating system, have a problem because acquisition of language information is completely dependent on the operating system.

Furthermore, in an environment where multinational users exist, it is necessary to change the language of messages displayed on a setting screen or the like. For this purpose, driver software for a device provided for a number of countries, or storage operation control means using the aforementioned intermediate language or the like, are installed in one data processing apparatus. In such case, plural softwares, having no difference in actual functions, are installed. This inefficiently consumes the storage capacity of an external memory of the data processing apparatus, and obstructs the ease of use.

In addition, providing software having mostly the same contents, but partly different, for each environment is cumbersome to the product suppliers. This causes problems such as higher manufacturing costs and complicated product management.

SUMMARY OF THE INVENTION

The present invention is made in consideration of the above situation, and has as its object to provide a data processing apparatus adaptable to plural operation environments, and a data processing method.

Another object of the present invention is to provide driver software for controlling operation of peripherals, e.g., printer or the like, which can externally acquire and set environment data.

More specifically, the present invention provides a data processing apparatus comprising: conversion means for spooling a rendering command based on data generated by an application program and converting the data so as to comply with an output format of an external device; and print data generation means for generating print data, which can be interpreted by the external device, based on the data converted by said conversion means, wherein said conversion means changes a processing content in accordance with environment data related to a usage environment of said data processing apparatus.

More specifically, the present invention provides a data processing method comprising: a conversion step of spooling a rendering command based on data generated by an application program and converting the data so as to comply with an output format of an external device; and a print data generation step of generating print data, which can be interpreted by the external device, based on the data converted in said conversion step, wherein in said conversion step, a processing content is changed in accordance with environment data related to a usage environment of said data processing method.

More specifically, the present invention provides a data processing apparatus comprising: conversion means for spooling a rendering command based on data generated by an application program and converting the data so as to comply with an output format of an external device; and print data generation means for generating print data, which can be interpreted by the external device, based on the data converted by said conversion means, wherein said conversion means causes to display a message in a language system corresponding to environment data related to a usage environment of said data processing apparatus.

More specifically, the present invention provides a data processing method comprising: a conversion step of spooling a rendering command based on data generated by an application program and converting the data so as to comply with an output format of an external device; and a print data generation step of generating print data, which can be interpreted by the external device, based on the data converted in said conversion step, wherein said conversion step causes to display a message in a language system corresponding to environment data related to a usage environment of said data processing method.

More specifically, the present invention provides a storage medium storing a computer-readable program for causing a computer executing the program to operate as a data processing apparatus comprising: conversion means for spooling a rendering command based on data generated by an application program and converting the data so as to comply with an output format of an external device; and print data generation means for generating print data, which can be interpreted by the external device, based on the data converted by said conversion means, wherein said conversion means changes a processing content in accordance with environment data related to a usage environment of said data processing apparatus.

More specifically, the present invention provides a storage medium storing a computer-readable program for causing a computer executing the program to operate as a data processing apparatus comprising: conversion means for spooling a rendering command based on data generated by an application program and converting the data so as to comply with an output format of an external device; and print data generation means for generating print data, which can be interpreted by the external device, based on the data converted by said conversion means, wherein said conversion means causes to display a message in a language system corresponding to environment data related to a usage environment of said data processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a flowchart describing operation of a spool file manager 304.

DETAILED DESCRIPTION OF THE PREFERRED EMBODIMENTS

Preferred embodiments of the present invention will be described in detail in accordance with the accompanying drawings.

First, a construction of a data processing system according to a first embodiment of the present invention is described with reference to FIG. 1. Note that as long as the function according to the present invention is realized, the present invention is applicable to an apparatus comprising a single device, or a system constituted by a plurality of devices, or a system which performs processing through a network such as Local Area Network (LAN), Wide Area Network (WAN) or the like.

Figure 1:
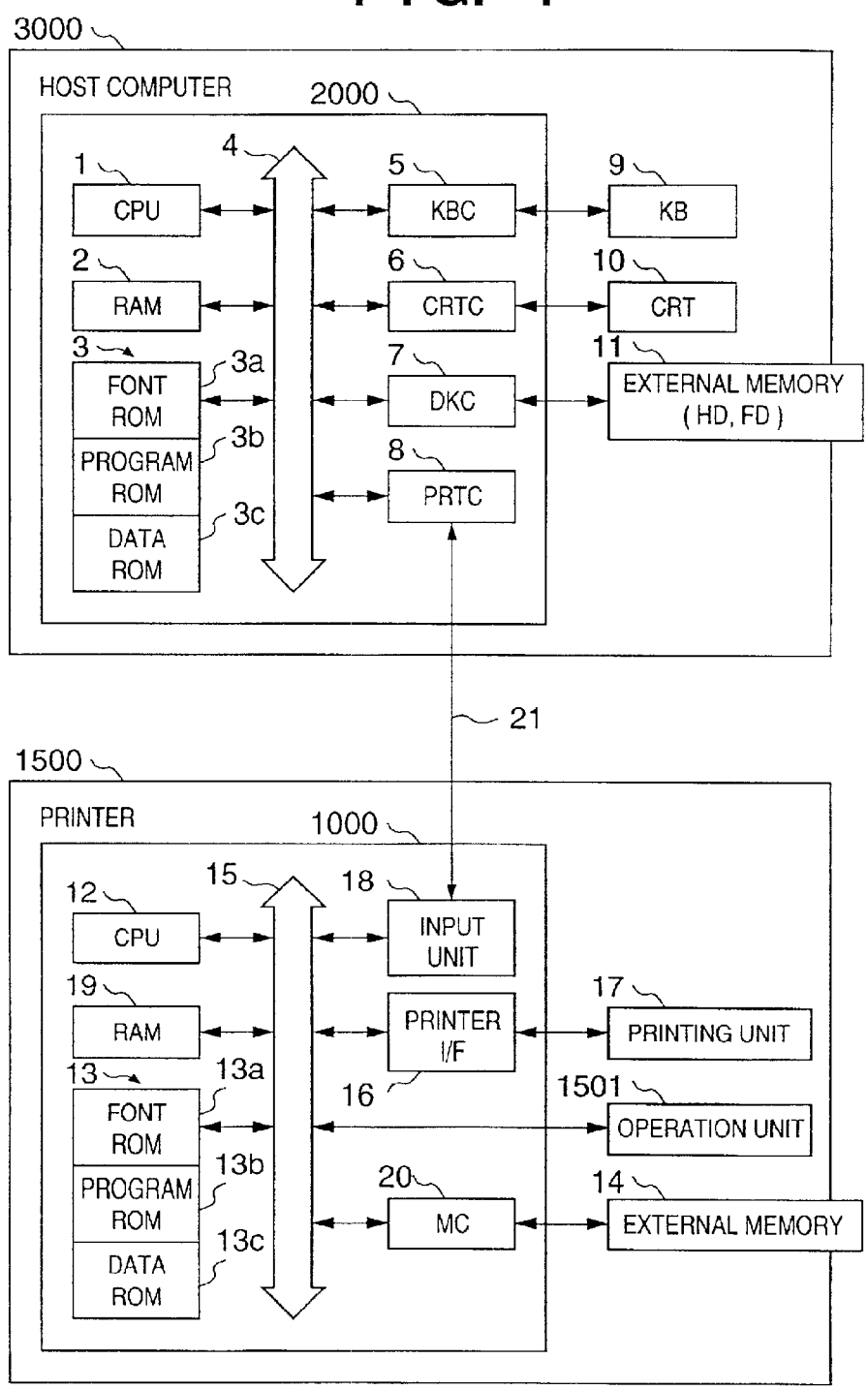
FIG. 1 is a block diagram showing a construction of a data processing system according to embodiments of the present invention.

As shown in FIG. 1, the data processing system according to the first embodiment is configured by a host computer 3000 and printer 1500. The host computer 3000 comprises: CPU 1, RAM 2, ROM 3, keyboard controller (KBC) 5, CRT controller (CRTC) 6, disk controller (DKC) 7, printer controller (PRTC) 8, keyboard (KB) 9, CRT display (CRT) 10, and an external memory 11. To the keyboard 9, pointing devices, e.g., a mouse, tablet, joystick or the like, are normally connected.

First, each unit of the host computer 3000 is described in detail. The CPU 1 is a central processing unit which integrally controls respective devices connected to a system bus. The CPU 1 executes processing of document data including figures, images, characters, tables (including spreadsheets) and so forth, based on a document processing program or the like stored in program ROM 3b (to be described later) of the ROM 3 or the external memory 11. Furthermore, the CPU 1 develops (rasterizing) outline font data to display-data RAM set in the RAM 2, realizing the What You See Is What You Get (WYSIWYG) feature (the function which enables a user to see, on a CRT display screen, the size and shape of a print-out image) on the CRT display 10.

Moreover, the CPU 1 opens various windows registered in advance to execute various data processing, based on a command instructed with a mouse cursor (not shown) or the like through a GUI or the like displayed on the CRT display 10. When printing is to be performed by the printer 1500, a user opens a window for print setting and sets a print processing method of the printer driver, including print mode selection and settings of the printer 1500.

The RAM 2 serves as a main memory and work area. The ROM 3 includes font ROM 3a, program ROM 3b, and data ROM 3c. The font ROM 3a or external memory 11 stores font data or the like used in the aforementioned document processing. The program ROM 3b or external memory 11 stores an operating system (OS), serving as a control program of the CPU 1. The data ROM 3c or external memory 11 stores various data used when the aforementioned document processing is performed.

The keyboard controller (KBC) 5 controls input operation of the keyboard 9 or aforementioned pointing device (not shown). The CRT controller (CRTC) 6 controls display operation of the CRT display (CRT) 10. The disk controller (DKC) 7 controls accessing the external memory 11. The printer controller (PRTC) 8 is connected to the printer 1500 through a bi-directional interface 21, and controls communication with the printer 1500. The keyboard 9 comprises various keys. The CRT display (CRT) 10 displays graphics, images, characters, tables and so forth.

The external memory 11, including hard disk (HD), floppy disk (FD), magneto-optical disk (MO) and so on, stores boot programs, various application programs, font data, user files, edit files, printer control command generation program (printer driver) and so on. The above-described units: CPU 1, RAM 2, ROM 3, KBC 5, CRTC 6, DKC 7, and PRTC 8 are provided in a computer control unit 2000.

Next, each unit of the printer 1500 is described in detail. A CPU 12 is a central processing unit which integrally controls respective devices connected to a system bus 15. The CPU 12 outputs an image signal as output data to a printing unit (printer engine) 17 based on a control program stored in program ROM 13b (to be described later) of ROM 13 or in an external memory 14. The CPU 12 can communicate with the host computer 3000 via an input unit 18. By this, information stored in the printer 1500 or the like can be informed to the host computer 3000. RAM 19 serves as a main memory of the CPU 12 or as a work area. The memory capacity of the RAM 19 can be extended by using optional RAM (not shown) connected to an extension port.

Note that the RAM 19 is used as an output data development area, environment data storage area, NVRAM or the like. ROM 13 includes font ROM 13a, program ROM 13b, and data ROM 13c. The font ROM 13a stores font data or the like which is used when the aforementioned output data is generated. The program ROM 13b stores control programs or the like for the CPU 12. The data ROM 13c stores data used by the host computer 3000 when an external memory 14, e.g., hard disk or the like, is not connected to the printer 1500.

The input unit 18 performs data reception/transmission between the printer 1500 and host computer 3000 through the bi-directional interface 21. A printer interface (I/F) 16 executes data reception/transmission between the CPU 12 and printing unit 17. A memory controller (MC) 20 controls accessing the external memory 14. The printing unit 17 performs printing operation based on the control operation of the CPU 12. An operation unit 1501 comprises switches for various operations and display means (e.g., a liquid crystal display panel and LED indicator). The external memory 14, comprising hard disk (HD), an IC card and the like, is connected to the printer 1500 as an option.

The external memory 14 stores font data, emulation programs, form data and so on. Accessing the external memory 14 is controlled by the MC 20. Note that not only one, but plural external memories 14 may be provided. More specifically, in addition to stored fonts, an optional card or an external memory storing programs for interpreting different printer control languages, may be connected to the printer 1500. Moreover, NVRAM (not shown) may be provided to store printer mode setting information set by the operation unit 1501.

The above-described units: CPU 12, RAM 19, ROM 13, input unit 18, printer I/F 16, and MC 20 are provided in a printer control unit 1000.

Figure 2:
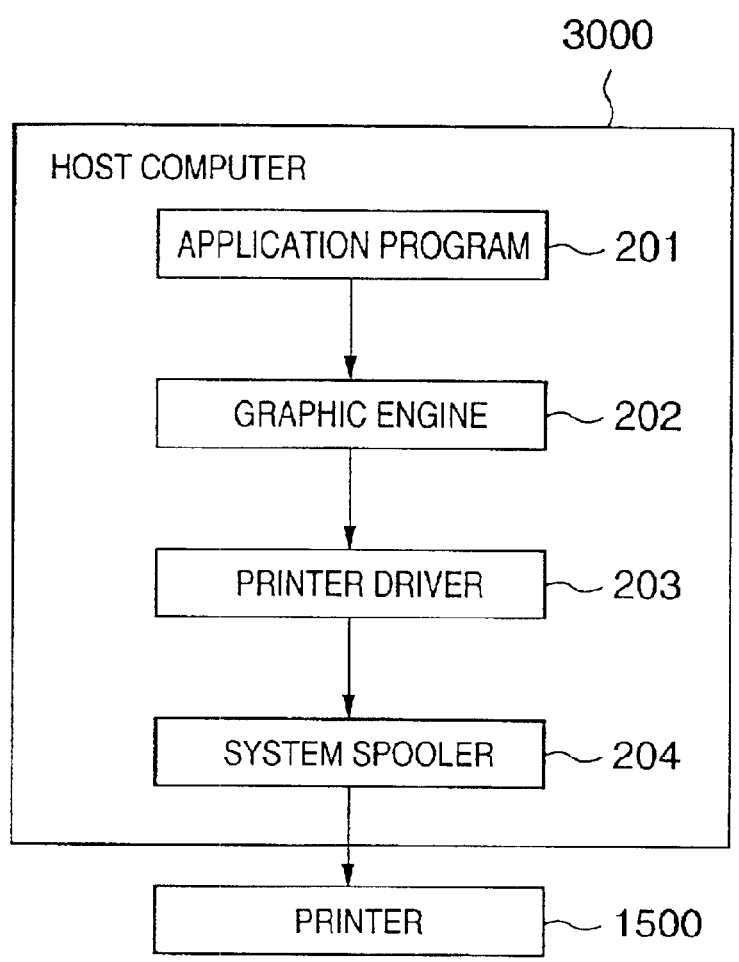
FIG. 2 is a block diagram showing a typical printing processing flow in a host computer connected to a printer.

FIG. 2 is a block diagram showing a typical printing processing flow in the host computer connected directly or through a network to a printing apparatus e.g., printer. In FIG. 2, an application program 201, graphic engine 202, printer driver 203 and system spooler 204 are stored as files stored in the external memory 11 shown in FIG. 1. When executed, these program modules are loaded to the RAM 2 by an OS or a module using these program modules. The application program 201' and printer driver 203 may be stored in HD serving as an external memory 11, via a FD or CD-ROM (not shown) serving as an external memory 11, or through a network (not shown).

The application program 201, stored in the external memory 11, is loaded to the RAM 2 to be executed. When printing is performed by the printer 1500 by using the application program 201, output operation (rendering) is performed by using the graphic engine 202, loaded to the RAM 2 for being executed. The graphic engine 202 loads the printer driver 203 similarly from the external memory 11 to the RAM 2 and sets output data of the application program 201 to the printer driver 203. Note that the printer driver 203 has been installed in advance for each printing apparatus available to the host computer 3000. The graphic engine 202 then converts a graphic device interface (GDI) function, transmitted by the application program 201, to a device driver interface (DDI) function, and outputs the DDI function to the printer driver 203.

The printer driver 203 converts print data to a printer control command recognizable by the printer, e.g., page description language (PDL), based on the DDI function transmitted by the graphic engine 202. The converted printer control command is sent to the system spooler 204, loaded to the RAM 2 by the OS, and outputted to the printer 1500 as print data through the interface 21. As will be described later, in the print control system according to the first embodiment, the printer driver 203 stores environment data, e.g., local ID or the like, in a form referable by an external module.

Figure 3:
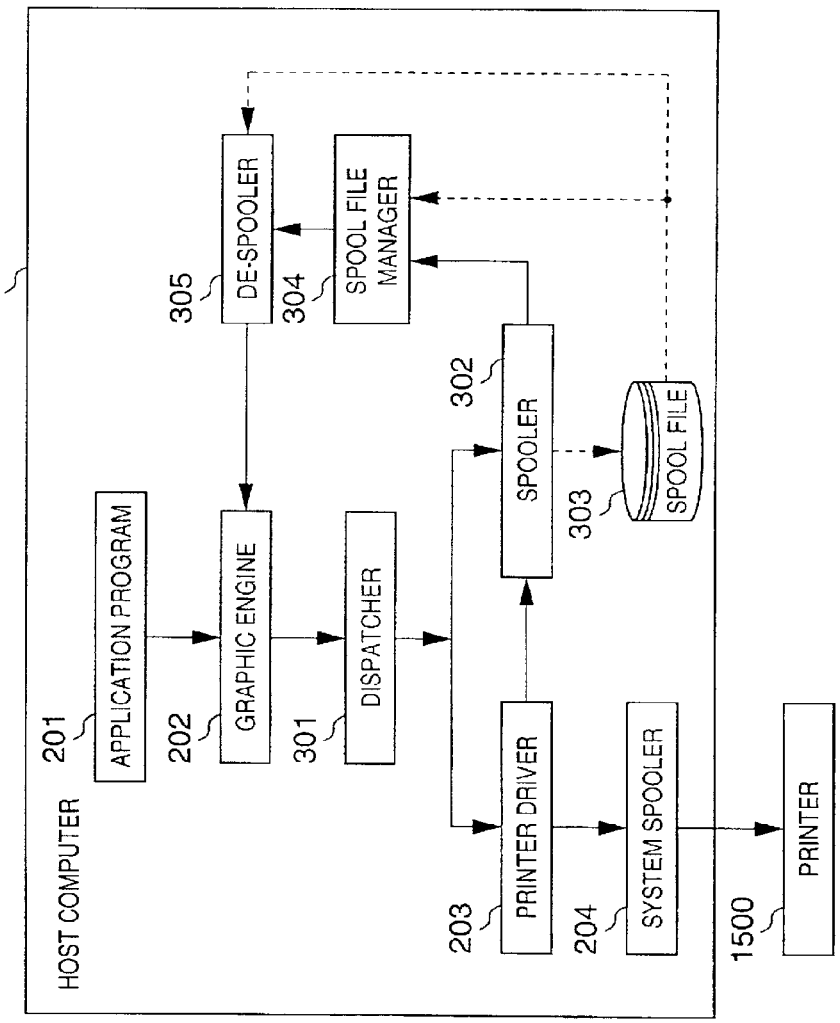
FIG. 3 is a block diagram showing a construction of a data processing system, having a configuration for spooling intermediate code data in addition to the construction shown in FIG. 2.

In addition to the structure configured by the printer 1500 and host computer 3000 shown in FIGS. 1 and 2, the data processing system according to the first embodiment comprises the structure shown in FIG. 3 in which print data from the application program is spooled once in the form of intermediate code data. FIG. 3 shows an extended system of FIG. 2. FIG. 3 has a structure for generating a spool file 303 consisting of intermediate codes, when a print command is transmitted from the graphic engine 202 to the printer driver 203. Note that the arrows shown in FIG. 3 indicate the main data flow related to printing. In reality, data exchange is performed bi-directionally between components.

A dispatcher 301, spooler 302, spool file manager 304, and de-spooler 305, included in the configuration shown in FIG. 3 of the first embodiment, are stored as program module files in the external memory 11. When these module files are executed, these files are loaded to the RAM 2 by an OS or other program modules. The spool file 303 is allocated to, for instance, a predetermined area of the external memory 11.

In the system shown in FIG. 2, the application program 201 is released from print processing after the printer driver 203 completes conversion of all print commands of the graphic engine 202 to control commands of the printer 1500. On the other hand, in the system shown in FIG. 3, the application program 201 is freed from print processing when the spooler 302 converts all print commands to intermediate code data and outputs the intermediate code data to the spool file 303. Normally, the latter is less time consuming.

Furthermore, in the system shown in FIG. 3, contents of the spool file 303 can be modified. By virtue of this, the system shown in FIG. 3 can realize enlargement/reduction, "N-up printing" for reducing plural pages so as to be printed in one page, and other functions which cannot be realized by the application program 201. For this purpose, the system shown in FIG. 2 is extended to have a structure shown in FIG. 3 that enables spooling of print data in intermediate code data.

To modify print data, normally modification setting is performed in advance, using a window serving as a GUI which is provided by the printer driver 203. The printer driver 203 stores contents of the modification setting in the RAM 2 or external memory 11.

Hereinafter, FIG. 3 is described in detail. In the extended print processing as shown in FIG. 3, a print command transmitted by the graphic engine 202 is received by the dispatcher 301. If the print command, transmitted from the graphic engine 202 to the dispatcher 301, is a print command which has been sent by the application program 201 to the graphic engine 202, the dispatcher 301 loads the spooler 302, stored in the external memory 11, to the RAM 2, and transfers the print command not to the printer driver 203 but to the spooler 302.

The spooler 302 converts the received print command to intermediate codes to be outputted to the spool file 303. The spooler 302 acquires modification setting of the print data, which has been set for the printer driver 203, from the RAM 2 or external memory 11 via printer driver 203, and stores the acquired setting in the spool file 303. Note that although the spool file 303 generated is stored as a file in the external memory 11, it may be stored in the RAM 2. Furthermore, the spooler 302 loads the spool file manager 304, stored in the external memory 11, to the RAM 2, and informs the spool file manager 304 of the generation state of the spool file 303.

Then, the spool file manager 304 determines with respect to the print data stored in the spool file 303, whether or not printing can be performed according to the modification setting. If the spool file manager 304 determines that printing can be performed using the graphic engine 202, the de-spooler 305 stored in the external memory 11 is loaded to the RAM 2, and the spool file manager 304 instructs the de-spooler 305 to perform print processing of the intermediate codes stored in the spool file 303.

The de-spooler 305 modifies the intermediate codes, included in the spool file 303, according to the modification setting stored in the spool file 303, and outputs the modified codes to the graphic engine 202.

If a print command, transmitted from the graphic engine 202 to the dispatcher 301, is a print command which has been sent by the de-spooler 305 to the graphic engine 202, the dispatcher 301 transfers the print command not to the spooler 302 but to the printer driver 203. The printer driver 203 generates a printer control command and outputs it to the printer 1500 through the system spooler 204.

<Printer Construction>

Figure 5:
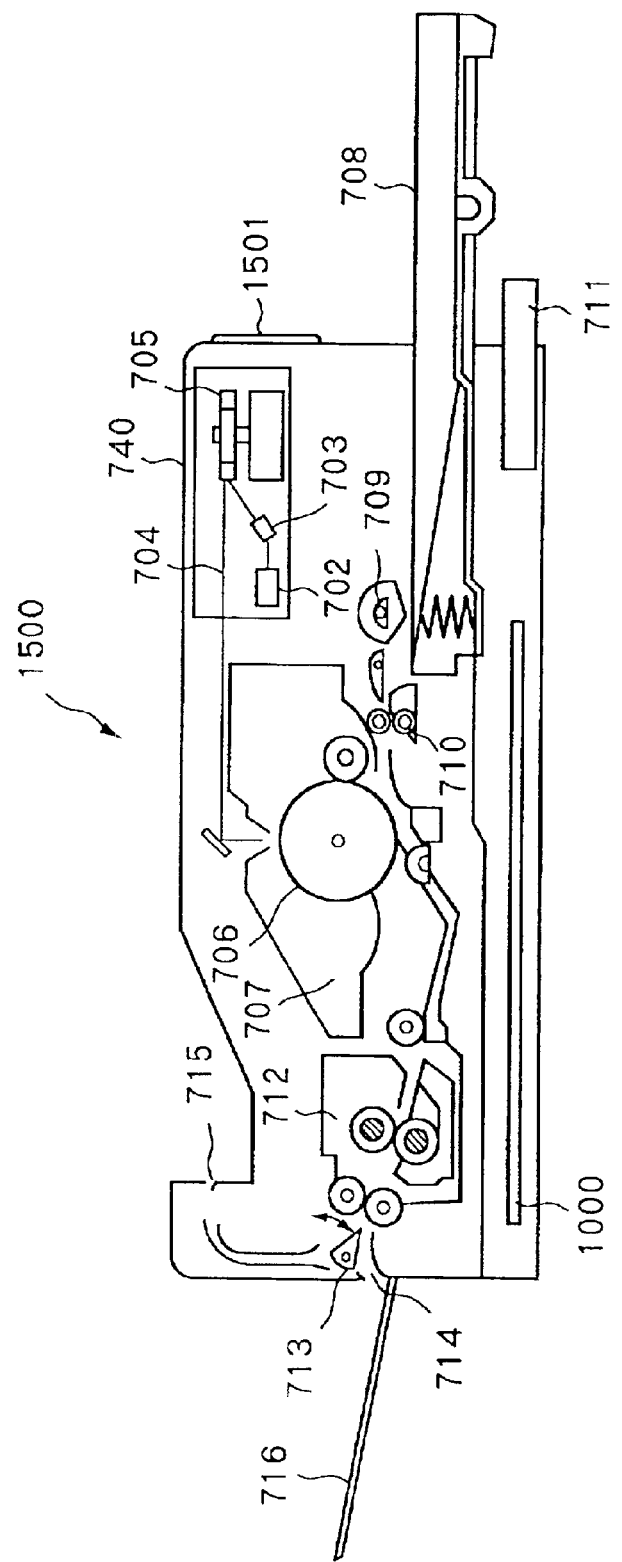
FIG. 5 is a cross-section showing an internal structure of a laser-beam printer.

FIG. 5 is a cross-section showing an internal structure of a laser-beam printer (LBP) as an example of the printer 1500 according to the first embodiment. The LBP serving as the printer 1500 can print inputted character pattern data or the like on a print medium.

The printer 1500 comprises an LBP main body 740 for forming an image on print paper serving as a print medium based on printer control commands supplied. The LBP main body 740 comprises a printer control unit 1000, operation unit 1501, laser driver 702, semiconductor laser device 703, rotational polygon mirror 705, electrostatic drum 706, development unit 707, paper cassette 708, conveyance roller 710, external memory 711, face-down discharge unit 715, and paper discharge tray 716.

Construction and operation of each of the foregoing units are described. The printer control unit 1000 controls the entire LBP main body 740, and analyzes character pattern data or the like. The printer control unit 1000 mainly converts a printer control command to a video signal and outputs it to the laser driver 702. The external memory 711, which supplies font data, emulation programs in page description language and so on, can be connected to the printer control unit 1000. The operation unit 1501 comprises switches for various operations and display means (e.g., LED indicator), as mentioned above.

The laser driver 702, driving the semiconductor laser device 703, turns on/off a laser beam 704 emitted by the semiconductor laser device 703 in accordance with the input video signal. The semiconductor laser device 703 emits a laser beam to the rotational polygon mirror 705. The rotational polygon mirror 705 reflects the laser beam 704 in the lateral direction to scan the electrostatic drum 706. By scanning the electrostatic drum 706 with the laser beam 704, an electrostatic latent image of a character pattern is formed on the drum surface.

The development unit 707, arranged peripherally to the electrostatic drum 706, develops an electrostatic latent image. A developer, e.g., toner or the like, which develops a latent image is transferred to print paper. The paper cassette 708 holds, for instance, cut sheet or the like, as print paper. The paper feed roller 709 and conveyance roller 710 feed the cut sheet paper, held in the paper cassette 708, to the LBP main body 740 and supply the paper to the electrostatic drum 706. Cut sheet paper may be supplied from a manual paper-feed tray (not shown) provided on the upper surface of the lid of the paper cassette 708. A fusing unit 712 fuses the toner image, transferred on the cut sheet paper, by heating. When a wedge-shaped claw 713 is set upward, the print paper on which an image is formed is discharged face-up from a face-up discharge unit 714. When the wedge-shaped claw 713 is set downward, the print paper is discharged face-down from the face-down discharge unit 715.

<Spooler Operation>

Figure 4:
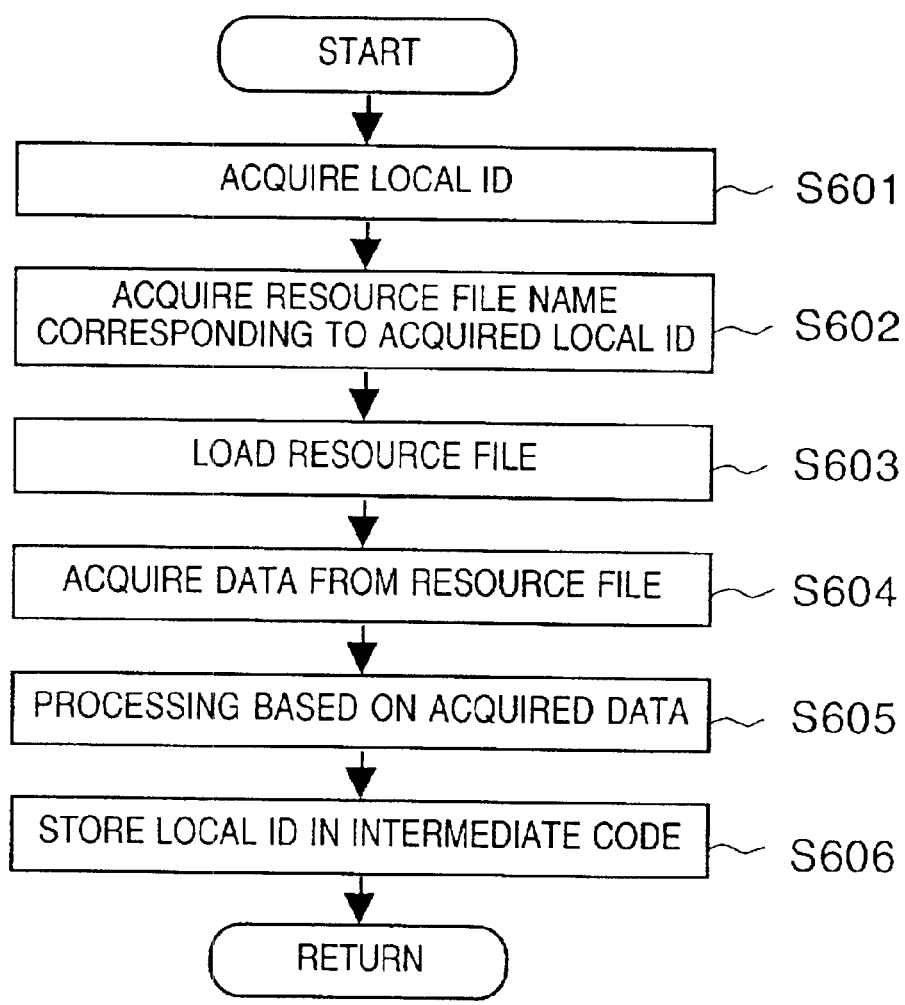
FIG. 4 is a flowchart describing operation of a spooler 302.

FIG. 4 is a flowchart showing processing steps of the spooler 302. As mentioned above, when a print command is transmitted by the application program 201, the dispatcher 301 loads the spooler 302. In this stage, local ID acquisition processing is performed. The local ID is predetermined for each country, and is stored in the printer driver 203 in a form referable by an external module. Although the form of storage is arbitrary, the scheme on how to refer to local IDs is predetermined; for example, a function for calling local ID data is defined, or a particular address of the external memory 11 is written by the driver 203, or the like. Herein, assume that the local ID is acquired from the driver 203.

The spooler 302 acquires a local ID from the printer driver 203 through the dispatcher 301 (step S601). More specifically, an acquisition request from the spooler 302 is transmitted to the dispatcher 301, and the dispatcher 301 acquires a local ID from the printer driver 203 and transmits the local ID to the spooler 302. Assume in the first embodiment that an ID indicative of Japan (e.g., 411) is acquired as a local ID. This indicates that the printer driver 203 is prepared for Japan.

Based on the acquired local ID, a resource file name corresponding to the local ID is acquired. A resource file, having information corresponding to a local ID, is stored in the external memory 11 in a form of, e.g., library. The resource file name is expressed by a character string (prefix)+local ID+extension (.dll), and is provided according to the location of the printer driver. The resource file name is acquired based on the acquired local ID. Herein, assuming that the prefix of the resource file name is "Cpcr", the obtained resource file name is Cpcr411.dll. In step S602, the file name Cpcr411.dll is acquired by the spooler 302.

After the resource file name is acquired, the resource file is loaded (step S603). A file, having the resource file name acquired in the previous step, is loaded from the external memory 11, e.g., hard disk, and developed in a predetermined area of the RAM 2. In the first embodiment, Cpcr411.dll is loaded.

Next, the spooler 302 acquires data from the loaded resource file (step S604). In this step, a local ID, i.e., information which requires changes in processing depending on the country, is acquired. For instance, in a case where a print command is sent by the application program but no font face is designated, it is necessary to designate and spool a default font. In such case, information corresponding to each local ID, acquired by loading or acquired from a resource file, is used. Herein, assume that default font information "Mincho" is acquired from the resource file Cpcr411.dll provided for Japan.

Using the information corresponding to the local ID which includes the default font type, the print data sent by the application program 201 is converted to an intermediate-code-format file. For instance, assume that the intermediate-code-format file consists of a data portion and an attribute portion. Upon completing conversion of the print data to intermediate code data, information corresponding to the local ID, i.e., a default font type to be used at the time of de-spooling, aforementioned modification setting and so forth, is set in the attribute portion, and a temporary file in the intermediate-code format is stored in the spool file 303 (step S605).

Then, the local ID is stored (step S606). Although the form of storage is arbitrary, the local ID is preferably stored in a form recognizable by the spool file manager 304 or de-spooler 305 or the like, i.e., modules subsequent to the spooler 302. For instance, similar to print data, the local ID may be stored in the intermediate-code format in a particular area of the external memory 11.

The temporary file generated in the above-described manner is subjected to determination by the spool file manager 304 for determining whether or not the data is printable. Then, necessary modification is made by the de-spooler 305, and the modified data is outputted to the printer 1500 through the graphic engine 202 and printer driver 203.

In the above-described system, since print data is spooled as font data, a default font is necessary. However, in this system, since spooling is performed before the processing of the printer driver, a default font prepared by the printer driver cannot be used as conventionally performed. Therefore, a default font is necessary for the spool file module. Herein, note that the spool file module is accessed by plural printer drivers. Thus, the default font of the spool file module must be changed according to the printer driver used for outputting data. For this reason, when a printer driver accesses the spool file module, a local ID is acquired, and based on the resource file corresponding to the acquired local ID, a default font is selected (e.g., in case of Japan, font "Mincho" is selected).

<Second Embodiment>

According to the first embodiment, information corresponding to a local ID, obtained from the printer driver, is used for the processing subsequent to the generation processing of a temporary file in the intermediate code format. However, the first embodiment employs information included in a resource file, corresponding to a local ID, for internal processing only. The second embodiment is characterized by employing a local ID for changing the type of language used for displaying data on a screen, when providing a user interface by at least one of the spooler 302, spool file manager 304 and de-spooler 305 for allowing a user to set messages e.g., an error message or process status, or to change setting of processing contents.

More specifically, similar to the first embodiment, the second embodiment is implemented in any of the spooler 302, spool file manager 304 or de-spooler 305, which are embodied as a part of the spool file module (independent of the printer driver) used commonly by a plurality of printer drivers. In such modules, for instance, in a case of a driver adopting LIPS (trademark of CANON Kabushiki Kaisha) using Japanese as a display language, Japanese must be set for a message returned by the spool file module to a printer driver, but in a case of a PCL (printer control language) driver using English as a display language, English must be set.

As similar to the first embodiment, the spooler 302 acquires a local ID from the printer driver 203, loads a resource file, and obtains data from the resource file. If a processing which requires displaying of a language, e.g., displaying a message for a user or user setting, occurs during the processing of one of the spooler 302, spool file manager 304 or de-spooler 305, the display language is decided according to information in the resource file. However, if a local ID has already been stored in the intermediate language format in the spooler 302, the resource file is loaded and data is acquired again by referring to the stored local ID, and display language can be decided.

FIG. 6 shows the display language deciding processing using a stored local ID. Herein, assume that 411 indicative of Japan is stored as a local ID, as similar to the first embodiment.

First, a local ID is acquired from a temporary storage file (step S801). Next, based on the acquired local ID, a resource file name corresponding to the local ID is acquired (step S802). As similar to the first embodiment, the resource file name is expressed by a character string (prefix)+local ID+extension (.dll), and is provided according to the location of the printer driver. The resource file name is acquired based on the acquired local ID. Herein, assuming that the prefix of the resource file name is "Cpcr", the obtained resource file name is Cpcr411.dll.

Next, the resource file is loaded (step S803). This is a processing of loading a file, having the resource file name acquired in the previous step. Herein, Cpcr411.dll is loaded.

Next, the spooler 302 acquires data from the loaded resource file (step S804). This step acquires information which requires changes in processing depending on the location. In other words, this step acquires information related to a display language for a user interface or error messages or the like, which needs to be changed for each location. In the second embodiment, assuming that the local ID represents Japan and a resource file for Japan is loaded, Japanese messages are acquired as a display language resource.

Based on the acquired data, operation processing is performed (step S805). Herein, because the display language resource acquired is in Japanese, a user interface and messages and the like are displayed in Japanese.

In the foregoing first and second embodiments, although the description has been provided in a case of using a printer as a peripheral device, the display language deciding processing may be employed in other peripherals.

Furthermore, although the aforementioned local ID indicates a country, as long as a receiving device can interpret the ID, any forms of code may be used. Moreover, although a resource file is independently provided in the above embodiments, depending on the amount of information of the resource file differing for each country, the printer driver may contain the data.

Furthermore, although the aforementioned local ID is assigned for each country, a local ID may be assigned by an arbitrary scheme. If one country adopts different language systems for different areas, a local ID may be assigned for each area. If a common environment data can be used for plural countries, a common local ID may be assigned for the plural countries.

Aforementioned modules such as the spooler, spool file manager, de-spooler and so forth may be realized by the CPU 1 executing predetermined software, or may be realized by dedicated hardware.

The present invention can be applied to a system constituted by a plurality of devices (e.g., host computer, interface, reader, printer) or to an apparatus comprising a single device (e.g., copying machine, printer, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been described above, according to the present invention, peripheral device control means provides environment data in a form referable by external modules. Therefore, even in a case where plural control means of one peripheral device are provided according to different usage environments, a single data processing apparatus adaptable to the plural control means can be realized.

The present invention is not limited to the above embodiments and various changes and modifications can be made within the spirit and scope of the present invention. Therefore, to apprise the public of the scope of the present invention, the following claims are made.

What is claimed is:

1. A data processing apparatus comprising:
    receiving means for receiving a drawing command based on data generated by an application program;
    first acquiring means for acquiring a local ID, which indicates country or area, from a printer driver;
    loading means for loading a resource file based on the local ID acquired by said first acquiring means;
    second acquiring means for acquiring default font data from the resource file loaded by said loading means;
    conversion means for converting the drawing command, which does not have a font face, to intermediate code data using the default font data acquired by said second acquiring means; and
    print data generation means for generating print data, which can be interpreted by an external device, based on the intermediate code data which has the default font data converted by said second conversion means.

2. The data processing apparatus according to claim 1, wherein the resource file includes information regarding a language used.

3. The data processing apparatus according to claim 1, wherein said print data generation means is a printer driver.

4. The data processing apparatus according to claim 3, wherein said conversion means is a module independent of a printer driver, and used commonly by a plurality of printer drivers.

5. The data processing apparatus according to claim 1, wherein said data processing apparatus comprises display means, and a process procedure of said conversion means includes displaying of a predetermined message on the display means,
    wherein a language of the predetermined message is changed in accordance with the resource file.

6. The data processing apparatus according to claim 1, wherein said conversion means is capable of changing a processing content for each job.

7. A data processing method comprising:
    a receiving step of receiving a drawing command based on data generated by an application program;
    a first acquiring step of acquiring a local ID, which indicates country or area, from a printer driver;
    a loading step of loading a resource file based on the local ID acquired in said first acquiring step;
    a second acquiring step of acquiring default font data from the resource file loaded by said loading steps;
    a conversion step for converting the drawing command, which does not have a font face, to intermediate code data using the default font data acquired in said second acquiring step; and
    a print data generation step, of generating print data, which can be interpreted by an external device, based on the intermediate code data, which has the default font data converted in said conversion step.

8. The data processing method according to claim 7, wherein the resource file includes information regarding a language used.

9. The data processing method according to claim 7, wherein said print data generation step is executed by a printer driver.

10. The data processing method according to claim 9, wherein said conversion step is executed by a module independent of the printer driver, and used commonly by a plurality of printer drivers.

11. The data processing method according to claim 7, wherein said conversion step comprises a step of displaying a predetermined message,
    wherein a language of the predetermined message is changed in accordance with the resource file.

12. The data processing method according to claim 7, wherein a processing content for each job can be changed in said conversion step.

13. A data processing apparatus comprising:
    receiving means for receiving a drawing command based on data generated by an application program;
    acquiring means for acquiring a local ID, which indicates the country or area, from a printer driver;
    loading means for loading a resource file based on the local ID acquired by said acquiring means;
    conversion means for converting the drawing command received by said receiving means to an intermediate code data;
    display means for displaying a predetermined measure related to the intermediate code data converted by said conversion means on a screen; and
    print data generation means for generating print data, which can be interpreted by the external device, based on the intermediate code data converted by said conversion means,
    wherein said display means changes the type of language of the predetermined message in accordance with the resource file loaded by said loading means.

14. The data processing apparatus according to claim 13, wherein the predetermined message is error display outputted to a printer driver serving as said print data generation means.

15. A data processing method comprising:
- a receiving step for receiving a drawing command based on data generated by an application program;
- an acquiring step, of acquiring a local ID, which indicates country or area, from a printer driver;
- a loading step of loading a resource file based on the local ID acquired by said acquiring step;
- a conversion step of converting the drawing command received in said receiving step to an intermediate code data;
- a display step of displaying a predetermined message related to the intermediate code data converted in said conversion step on a screen; and
- a print data generation step, of generating print data, which can be interpreted by an external device, based on the intermediate code data converted in said conversion step,
- wherein said display step changes the type of language of the predetermined message in accordance with the resource file loaded in said loading step.

16. The data processing method according to claim 15, wherein the predetermined message is an error message in said print data generation step.

17. A storage medium in which is stored a computer-readable program for causing a computer executing the program to operate as a data processing apparatus, said computer readable program being configured to enable said computer to perform the steps of:
- receiving a drawing command based on data generated by an application program;
- acquiring a local ID, which indicates country or area, from a printer driver;
- loading a resource file based on the local ID acquired by said acquiring step;
- acquiring default font data from the resource file loaded by said loading step;
- converting the drawing command, which does not have a font face, to intermediate code data using the default font data acquired by said acquiring step; and
- generating print data, which can be interpreted by an external device, based on the intermediate code data converted in said conversion step.

18. The storage medium according to claim 17, wherein the resource file includes information regarding a language used.

19. The storage medium according to claim 17, wherein said print data generation means is a printer driver.

20. The storage medium according to claim 19, wherein said conversion step is independent of a printer driver, and is used commonly for a plurality of printer drivers.

21. The storage medium according to claim 17, wherein said data processing apparatus comprises display means, and a processing procedure of said conversion step includes displaying of a predetermined message on the display means,
wherein a language of the predetermined message is changed in accordance with the resource file.

22. The storage medium according to claim 17, wherein said step of converting changes a processing content for each job.

23. A storage medium storing a computer-readable program for causing a computer executing the program to operate as a data processing apparatus having display means, said program enabling the data processing apparatus to perform the steps of:
- receiving a drawing command based on data generated by an application program;
- acquiring a local ID which indicates the country or area from the printer driver;
- loading a resource file based on the local ID acquired by said step of acquiring;
- converting the drawing command received in said step of receiving to an intermediate code data;
- displaying a predetermined message related to the intermediate code date converted in said converting step on a screen; and
- generating print data, which can be interpreted by an external device, based on the intermediate code data converted in said converting step,
- wherein said displaying step changes the type of language of the predetermined message in accordance with the resource file loaded in said loading step.

24. The storage medium according to claim 23, wherein the predetermined message is error display outputted to a printer driver serving as said print data generation means.

* * * * *

UNITED STATES PATENT AND TRADEMARK OFFICE
CERTIFICATE OF CORRECTION

PATENT NO. : 7,064,849 B1 Page 1 of 1
APPLICATION NO. : 09/465387
DATED : June 20, 2006
INVENTOR(S) : Satoshi Nishikawa et al.

It is certified that error appears in the above-identified patent and that said Letters Patent is hereby corrected as shown below:

<u>COLUMN 14</u>:
Line 35, "date" should read -- data --.

Signed and Sealed this

Twenty-ninth Day of May, 2007

JON W. DUDAS
*Director of the United States Patent and Trademark Office*